United States Patent [19]

Kahn et al

[11] Patent Number: 5,080,467
[45] Date of Patent: Jan. 14, 1992

[54] BIPHENYL DERIVATIVES FOR PHOTOSTABILIZATION IN PULSED OPTICAL DARKENING APPARATUS AND METHOD

[75] Inventors: Frederic J. Kahn, Palo Alto, Calif.; Richard Albert, San Jose, Calif.; Jerry Leff, Saratoga, Calif., Evan D. Laganis, Wilmington, Del., Howard Simmons III, Newark, N.J.

[73] Assignee: Greyhawk Systems, Inc, Milpitas, Calif.

[21] Appl. No.: 619,658

[22] Filed: Nov. 27, 1990

Related U.S. Application Data

[63] Continuation of Ser. No. 318,669, Mar. 3, 1989, abandoned.

[51] Int. Cl.⁵ .................................................. G02F 1/12
[52] U.S. Cl. ........................................ 359/45; 359/96; 359/104; 359/36
[58] Field of Search ........................ 350/349, 351, 345; 365/108; 252/299.3

[56] References Cited

U.S. PATENT DOCUMENTS

| | | | |
|---|---|---|---|
| 3,789,225 | 1/1974 | Leder | 350/351 X |
| 3,947,375 | 3/1976 | Gray | 252/299 |
| 4,150,396 | 4/1979 | Hareng et al. | 350/351 X |
| 4,477,151 | 10/1984 | Mash | 350/351 |
| 4,550,980 | 11/1985 | Shingu | 350/349 |
| 4,606,613 | 8/1986 | Urabe | 350/351 X |
| 4,653,867 | 3/1987 | Urabe et al. | 350/351 |
| 4,675,699 | 6/1987 | Kan et al. | 350/351 |
| 4,752,820 | 6/1988 | Kuroiwa et al. | 365/108 |
| 4,770,499 | 9/1988 | Kobayashi et al. | 350/345 |
| 4,799,770 | 1/1989 | Kahn et al. | 350/331 R |
| 4,829,509 | 5/1989 | Schrott | 346/135.1 X |

Primary Examiner—Stanley D. Miller
Assistant Examiner—Huy K. Mai
Attorney, Agent, or Firm—Flehr, Hohbach, Test, Albritton & Herbert

[57] ABSTRACT

An apparatus for a liquid crystal image projection system having a liquid crystal cell, including optical apparatus for inducing a uniform texture of scattering centers in a liquid crystal cell by impinging a pulse of optical energy on the liquid crystal cell, thereby the optical energy is absorbed and converted to thermal energy heating the liquid cyrstal to a second temperature, the end of the pulse bringing about a cooling which causes the liquid crystal centers within the liquid crystal cells to scatter in a uniform texture.

14 Claims, 1 Drawing Sheet

BIPHENYL DERIVATIVES FOR PHOTOSTABILIZATION IN PULSED OPTICAL DARKENING APPARATUS AND METHOD

This is a continuation of application Ser. No. 318,669 filed Mar. 3, 1989 and now abandoned.

BACKGROUND OF THE INVENTION

1. Field of the Invention

The present invention relates to liquid crystal cell image projection systems. More specifically, the present invention relates to the use of optical energy to produce a uniform texture of scattering centers in a liquid crystal cell and an associated optical darkening of an image produced by this cell.

2. Summary of the Prior Art

Liquid crystal cells are useful in display, optical processing, printing and related image projection applications. In these applications they serve as light valves or light modulators which control the flow of light from a light source to a receiver or receiving surface. When suitable spatial electronic addressing means is incorporated in a liquid crystal light valve system, spatially varying patterns can be written on the liquid crystal layer. The liquid crystal cell then becomes a spatial light modulator. When suitable illumination optics, typically including a light source and optical condenser, and suitable projecting optics, typically including a projection lens with appropriate aperture, are included in a liquid crystal light valve system, the liquid crystal cell then becomes an electronic slide which determines and controls the image projected onto a display screen, photosensitive detector array or photosensitive writing medium for display, optical processing, and printing applications, respectively.

The spatial variations of the image on the liquid crystal cell virtually always correspond to differences in the molecular orientation (different textures) of the liquid crystal in different regions of the liquid crystal layer. The spatially varying differences in molecular orientation are converted into spatially varying light intensity variations by means of suitable polarizing optics or suitable apertures to selectively pass and block scattered or refracted light from these spatially different regions. The various possibilities have been reviewed in detail (see F. J. Kahn, "The Molecular Physics of Liquid Crystal Devices," Physics Today, May 1982).

In one mode of operation the entire image area of the liquid crystal cell is switched, typically by electrical or thermal means, into a texture with uniform order (or disorder) thereby providing a uniform image background. One or more spatially varying images with different textures are then superposed, by the spatial addressing means, onto the uniform image background in order to create an image on the liquid crystal cell, and hence on the receiving surface, with the desired spatial variations in intensity and contrast.

This invention relates to improved methods and apparatus for creating uniform image backgrounds. This is an area of generic importance not only for display and imaging applications as described above, but is also of importance for other liquid crystal applications such as nondestructive thermal testing using temperature sensitive liquid crystals.

Referring to FIG. 1, a cross sectional view of a typical prior art liquid crystal cell 10 is shown. The cell 10 is filled with liquid crystal 20. A suitable liquid crystal is a smectic A liquid crystal. The crystal is contained on two sides by a first and second electrode 16 and 18. The electrodes 16 and 18 are substantially parallel plates made of transparent material. A suitable material for the electrodes is indium-tin-oxide. The electrodes 16 and 18 serve to allow application of an electric field in a direction essentially normal to the liquid crystal layer while allowing projection light to be transmitted through the liquid crystal layer. The liquid crystal cell 10 is further comprised of a first and second transparent substrate, 12 and 14, typically glass. Among other things, the transparent substrates permit the passage of light, support the electrodes, and provide integrity to the liquid crystal cell.

In the image projection system context, liquid crystal cell image projection systems incorporate means for creating an image on a liquid crystal cell and then use the created images as a mask for projection exposure of photosensitive media for photolithographic processing such as fabrication of printed wiring boards. One of the initial steps in producing an image on a liquid crystal cell involves forming a uniform texture of scattering centers. Scattering centers refer to the characteristic texture of the liquid crystal material in the cell 10. Scattering centers scatter and depolarize light. Conversely, liquid crystal regions without scattering centers transmit light without deflecting it or depolarizing it. A uniform texture of scattering centers is a macroscopic volume of liquid crystal cell 10 which scatters incident light.

The uniform texture of scattering centers is then "drawn" on by a laser beam to create an image. The laser beam etches an image in the uniform texture of scattering centers by creating non-scattering regions wherever it impinges. The process of impinging laser light on the uniform texture of scattering centers to produce nonscattering centers is known in the art, (F. J. Kahn, "Locally Erasable Thermo-Optic Smectic Liquid Crystal Storage Displays," U.S. Pat. No. 3,796,999 dated Mar. 2, 1974).

The prior art contains two methods of rapidly producing large area uniform scattering textures by methods other than laser-scanning which is relatively slow. Both of these methods involve the use of electrical energy. In the first an electrical current pulse through the electrode is used to generate heat in the liquid crystal, the electrode heating method. In the second an electrical current pulse through the liquid crystal is used to create a turbulent material flow in the liquid crystal, the current-turbulence method. In the first method (see U.S. Pat. No. 4,799,770 to Frederic J. Kahn for a Liquid Crystal Cell for Image Projection and Method of Operating Same, issued Jan. 24, 1989), a signal from a voltage source 22 is applied across one of the electrodes. This method is illustrated in FIG. 1 where the voltage signal from the source 22 is applied across the electrode 18. In this embodiment, short electrical pulses are used to thermally induce a uniform texture of scattering centers over the substantially large surface area of the cell 10. The result, in an image projection system, is that the short electrical pulses result in a fast darkening of the image projected on the receiving surface. The electrical current sent through the electrode 18 produces thermal energy which raises the temperature of the liquid crystal material 20. Also, because it is a short pulse, the energy does not have time to spread deeply into the substrate. This lack of spreading facilitates rapid cooling which is responsible for the creation of a high density scattering centers. Physically, the liquid crystal is heated to a temperature at which it is an isotropic state. It then cools rapidly, quenching in some of the disorder of the isotropic state, and thereby produces a high density of scattering centers.

In an alternate embodiment of the prior art, the electrical pulses are applied across the liquid crystal 20. In this embodiment, following the work of Tani (C. Tani, Applied Physics Letters 19, 241-2, Oct. 1, 1973. "Novel Electro-Optical Storage Effect in a Certain Smectic Liquid Crystal"), a dc electric field applied across a thin layer of smectic A liquid crystal causes a current to flow in the liquid crystal. The current produces a turbulent flow of the liquid crystal analogous to the well-known dynamic scattering effect in nematic liquid crystals. This turbulence can produce a high density of optical scattering centers in smectic liquid crystal cells with appropriate conductivity and appropriate orienting layers on the substrates, and can also be produced by low frequency ac voltages as well as by dc voltages. See for example, W. A. Crossland and S. Canter, "An Electrically Addressed Smectic Storage Device," SID '85 Digest, pp. 124-126 (1985) and W. A. Crossland, J. H. Morrissy, and B. Needham, "Method for Preparing and Operating a Smectic Liquid Crystal Display Cell Having Indefinite Storage Properties," U.S. Pat. No. 4,139,273 (Feb. 13, 1979).

One problem with the first method is that small cosmetic defects in the electrodes, e.g., pinholes, etc., are not conductive and, therefore, do not produce the requisite heat to create scattering centers. For example, when a pinhole occurs in an electrode, the heat generated by the electrical current pulse is reduced not only in the area of the pinhole, but also in an area surrounding the pinhole. This phenomena is even more dramatic with a scratch which is oriented so as to divert the flow of current. Although the scratch may be barely visible on the face of the conducting electrode, not only the area of the scratch, but the surrounding area of the scratch is depleted of current and, therefore, of thermally generated scattering centers. In some typical applications such as display (U.S. Pat. No. 4,799,770 and Fabrication of Printed Wiring Boards, pending application U.S. Ser. No. 262,471), electrode defects as small as a few microns or less will be visible on the final projected images or affect the quality or positioning of image features such as line edges. Line edge positioning is particularly critical in the Printed Wiring Board Application where a typical line edge position tolerance of ±10% for a 0.003" wide wiring trace will correspond to a position tolerance of ±1.25 micrometer for the line edge on the liquid crystal cell at 6× projection magnification.

Another problem with electrically induced darkening is the deleterious effects of the required high voltage and current on the liquid crystal cell 10. The chemical and physical properties of the cell 10 may breakdown under the stress of high voltage and current surges associated with electrical darkening. Additionally, the high voltages and high current necessary to produce the desired short electric pulses require a relatively substantial amount of power.

Furthermore, considerable fabrication process work and control is required in order to tailor the electrical and geometric properties of the electrodes and liquid crystal to achieve the desired density and uniformity of scattering centers. For example, in the electrode heating method, the electrode must typically have a very low resistivity per unit area in order to minimize voltage across the liquid crystal which could result in electrical breakdown. As a result, contacts or busbars with much lower resistivity per unit area than the electrodes must typically be provided. The busbars minimize the voltage drop along the length of each contact thereby resulting in a spatially uniform current flow through the electrodes. (See F. J. Kahn et al, "A Paperless Plotter Display System Using a Laser Smectic Liquid-Crystal Light Valve, " SID 87 Digest, pp. 254-257). The busbars must be patterned, thus patterning steps are required in the fabrication process. These steps can result in cosmetic defects, increase process cost and reduce yield.

In the current-turbulence method, the liquid crystal typically must have conducting additives or dopants in it, in order to allow enough current flow to create the scattering center inducing turbulence. But the passage of current through the liquid crystal typically results in electrochemical processes which cause the devices to fail. Thus other dopants, such as redox dopants, must be added to the liquid crystal to counteract these electrochemical processes and extend lifetime. Finally processes need be developed to distribute these dopants uniformly through the liquid crystal cell and special low resistance contacts or busbars must be provided (requiring expensive and yield reducing patterning steps in the fabrication process). Thus, implementing either of these prior art methods results in considerable additional expense in fabrication of the liquid crystal cells.

SUMMARY OF THE PRESENT INVENTION

Accordingly, it is the object of the present invention to provide an apparatus and method for rapidly generating a uniform texture of scattering centers in a liquid crystal cell that does not require patterning, that is less sensitive to cosmetic defects in the electrodes and associated layers contacting or in proximity to the liquid crystal layer, and is generally less expensive to fabricate.

It is another object of the present invention to provide a uniform texture of scattering centers in a liquid crystal cell by impinging short pulses of optical energy on a liquid crystal cell.

It is another object of the present invention to provide a uniform texture of scattering centers in a liquid crystal cell without causing substantial electrical or chemical breakdown of the liquid crystal or electrode materials.

The attainment of these and related objects may be achieved through use of the novel pulsed optical darkening method and system herein disclosed. A pulsed optical darkening system in accordance with this invention includes a source of optical light pulses and a liquid crystal cell. The system has optical apparatus for inducing a uniform texture of scattering centers in a liquid crystal cell by impinging a pulse of optical energy on said liquid crystal cell. The optical energy is absorbed and converted to thermal energy heating the liquid crystal, which is in an initial state or texture, to a second state or texture. The initial state may, for example, be Smectic A and the initial texture may, for example, be nonscattering and essentially uniformly ordered. The second state may be isotropic.

After the end of the pulse the liquid crystal cools rapidly, thereby causing the formation of an areal uniform light scattering texture in the liquid crystal layer. The areally uniform light scattering texture will in turn produce an areally uniform darkened image when the liquid crystal layer is positioned as the image source or light control element in an appropriate imaging system. Although we talk here about an areally uniform light scattering texture, it will be understood that the uniformity must only be sufficient for the intended application. For example, in an imaging system for exposing photoresist for the fabrication of printed wiring boards, U.S. Ser. No. 262,471, the background of the projected image must be sufficiently darkened over the useful image area so that there is little or no photopolymerization of a negative working resist.

DETAILED DESCRIPTION OF THE PREFERRED EMBODIMENT

Figure 1:
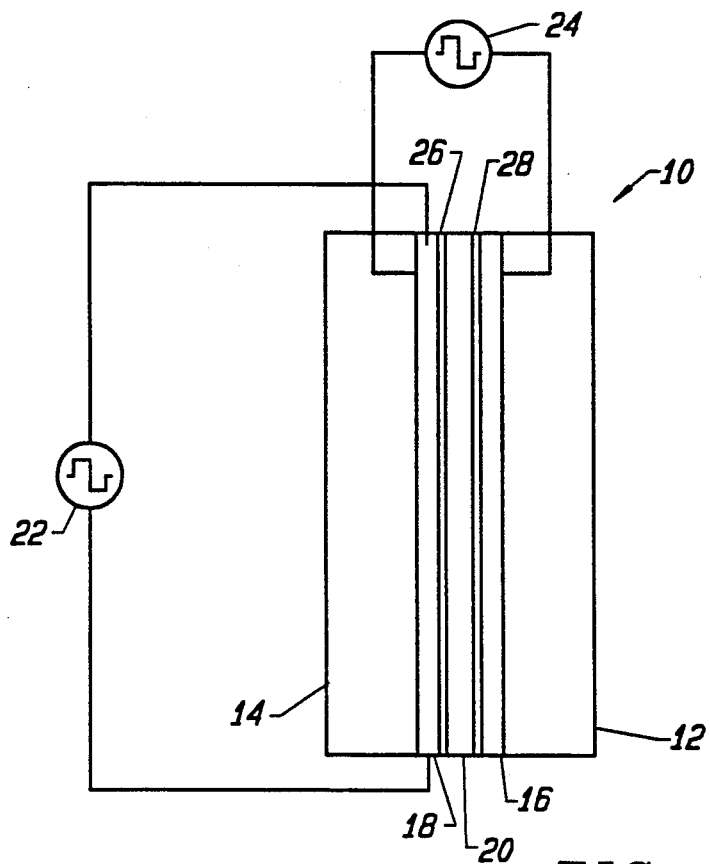
FIG. 1 is a cross-section view of prior art arrangements for producing a uniform texture of scattering centers in a liquid crystal cell.
Figure 2:
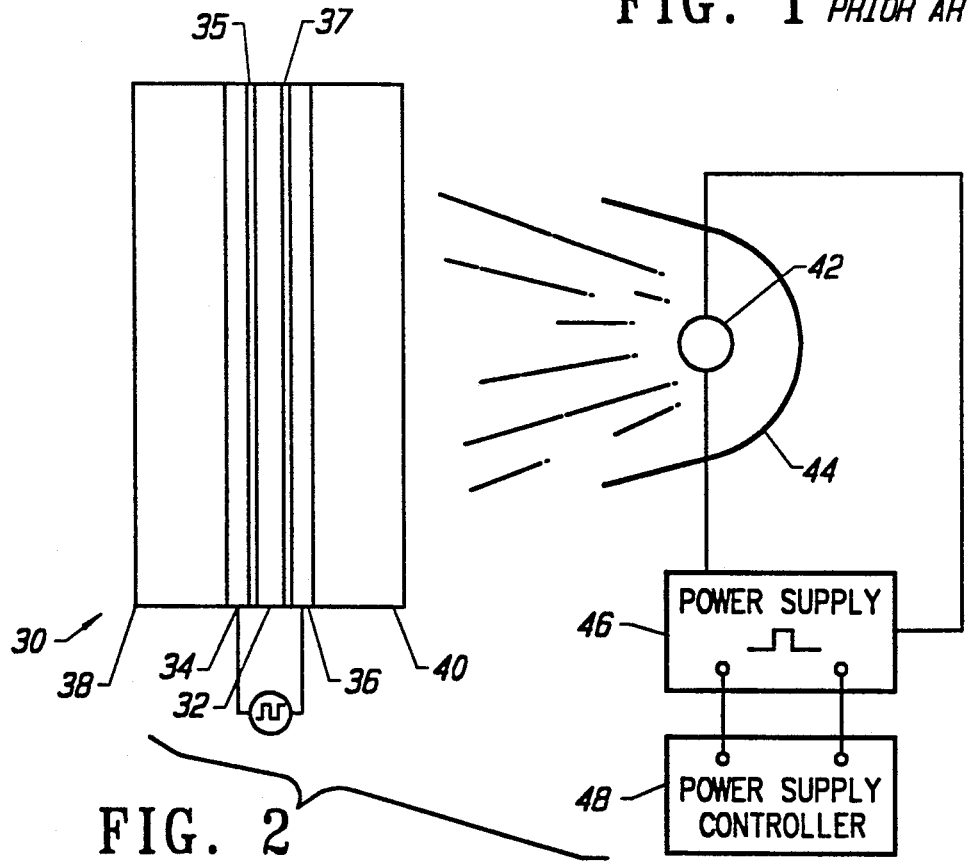
FIG. 2 is a cross-sectional view of the arrangement of a preferred embodiment for producing a uniform texture of scattering centers in a liquid crystal cell.

Referring to FIG. 2, a cross-sectional view of the arrangement for producing a uniform texture of scattering centers in a liquid crystal cell of a preferred embodiment is shown. In this arrangement a pulse of optical energy, as opposed to the electrical energy used in the prior art, is incident upon a liquid crystal cell 30. The optical energy is generated by a lamp 42. The lamp power is supplied by power supply 46 which is controlled by controller 48. The optical pulse is directed onto the liquid crystal cell 30. The optical energy is absorbed and converted into thermal energy. The thermal energy is sufficient to heat the liquid crystal 32 into a second state or texture, for example the isotropic state. The liquid crystal cools rapidly after the pulse ends, thereby causing the formation of a uniform texture of scattering centers. This texture partially preserves the disorder of the liquid crystal 32 in the second or isotropic state. Although liquid crystal is used in the preferred embodiment, the present invention is applicable to thermo-optical material in general. Also, the present invention is described below with reference to a transmissive projection system. It is recognized that transmissive and reflective projection systems are used in the art and the present invention applies equally well to reflective projection systems.

The liquid crystal cell 30, of the preferred embodiment, has a surface area of approximately four inches by four inches. Since a cross-section is shown in FIG. 2 only one of these dimensions is shown. To maintain thermal control the liquid crystal cell 30 is placed in an oven, as shown in co-pending U.S. application Ser. No. 262,471. The oven maintains the operating ambient temperature of the liquid crystal in the smectic state, but close to (typically 1 to 10 degrees C. below), the smectic-isotropic or smectic-nematic liquid crystal phase transition temperature. This minimizes the amount of optical energy required to heat the liquid crystal to the isotropic state. However, the temperature of the liquid crystal layer must be held at a sufficiently low temperature, typically determined experimentally, to obtain good image contrast and storage for the intended applications.

In a preferred embodiment the light source that is used to impinge a 1 msec long pulse of optical energy upon the cell 30 is a linear Xe flash tube 42 with an external gull-wing reflector 44. For the four inch by four inch surface area of the cell 30, the flash tube 42 is six inches long and linear in construction. The flash tube is located at an optical path length of about 12 inches from the cell 30. The flash tube 42 is excited by a 1.5 msec long electrical pulse with up to two kiloJoules electrical energy provided by a storage capacitor bank in power supply 46. This flash tube 42 is used because it provides an intense, short, spatially uniform optical beam at wavelengths absorbed by the liquid crystal or by absorbing layers in proximity to the liquid crystal. The beam is formed with reflector optics 44 and design techniques known in the industry. See for example, "The Optical Design of Reflectors," William B. Elmer, John Wiley (1980). The optical pulse method creates a uniform texture of scattering centers (or darkening of the liquid crystal cell) more rapidly than laser or optical scanning. This enables faster writing of bright patterns on dark backgrounds.

Alternative embodiments for the flash unit include pulses generated from other types and geometries of flash tubes (or lamps) such as Kr flash tubes or U-shape tubes. Commercial photographic photoflash guns, other pulsed sources of optical energy and shuttered continuous sources may also be used. The preferred embodiment, however, is particularly energy efficient. The optical energy need not be in the visible range, but may be all or partially at non-visible wavelengths such as ultraviolet or infrared. Also, it is recognized that liquid crystal cells of larger or smaller surface area could be used. The characteristics of the flash tube and reflector optics would be modified accordingly.

Optical Energy Absorption

To produce optical darkening (i.e., using optical energy to produce a uniform texture of scattering centers), it is sufficient that optical energy be impinged and absorbe by the liquid crystal itself or by additives dissolved or suspended in the liquid crystal. Alternatively, one or both electrodes 34 and 36 may include light absorbing material. Light absorbing material may also be placed in the substrate (glass and coatings), preferably in the coatings, for example in absorbing coatings 35 and 37. In the preferred embodiment, a specific combination of dyes (light absorbing materials) and stabilizer (chemically stabilizing material) is used to enhance darkening. These dyes and stabilizers are dissolved in the liquid crystal.

Ideally the dyes strongly absorb optical energy in wavelengths from 350 nanometers (nm) to 850 nm. In the case of a 436 nm projection, there is a transmission window centered at 436 nm to transmit the image projection light. The combination of dyes transmit minimal light from 350 nm to 850 nm except in a narrow band of wavelengths centered around 436 nm where transmittance is high. Furthermore, the dyes should have high extinction coefficients and good solubility in their liquid crystal solvent. Ideally the optical density or product of the extinction coefficient, concentration and pathlengths for the selected dyes at every wavelength would be greater than 2 except near 436 nm where the product would be less than, say 0.05.

In a preferred embodiment, a combination of dyes, liquid crystal solvent and stabilizer are used as a writing and darkening fill for the cell 30. The cell 30 acts as a light valve which controls the transmission of light. Writing, or drawing, on the cell 30 occurs after darkening.

The composition of the liquid crystal layer 28 in cell 30 includes several components. The first component is a material which is in a smectic A liquid crystalline state at the operating ambient temperature and may consist of a multicomponent mixture of alkyl- and alkoxy-cyanobiphenyl liquid crystal molecules and is essentially transparent to both visible and near infrared light. In a preferred embodiment the liquid crystal is one of the smectic A mixtures, such as S2, available commercially from BDH Limited of Poole, England.

The second component is a laser writing dye which is dissolved in the liquid crystal, component one, and which strongly absorbs the laser writing wavelength, but transmits most of the light at the projection wavelengths. In a preferred embodiment, the second component is selected from a class of strongly infrared absorbing dyes known as squaryllium derivatives, such as 0.05% to 0.5% by weight of NK-2772, a product of Nippon Kanko Shikiso Co. The laser writing process and additional laser writing dyes are described in pending U.S. application Ser. No. 262,471 and in D. J. Gravesteijn and J. Van der Veen, "Organic-Dye Films for Optical Recording," Philips Tech. Rev., Vol. 41, 325-33, 1983/84, No. 11/12. Squarylium derivative dyes with suitable solubility in the liquid crystal and appropriate laser absorption may be found in the class of dyes derived from a condensation of a 2,6-bis(dialkyl)-4-methyl-thiopyrylium salt with squaric acid.

The third component is one or more pulsed optical darkening dyes with optical properties and solubility as described above. Suitable dyes may be selected from various non ionic, liquid crystal soluble dyes such as the D series of azo and anthroquinone dyes available from BDH Limited. In a preferred embodiment, the third component is selected from the class of squaryllium dye derivatives derived from condensation of a 2,6-bis(-dialkyl)-4-methyl-thiopyrylium salt with squaric acid, for example, 0.05% to 0.5% by weight of 1,3-bis-($\alpha,\alpha'$-ditertiarybutylpyryilinylidenyl)2,4-dioxo-4-cyclobutene. This molecule absorbs over a broad wavelength range extending from about 600 nm to about 760 nm. Since component two, the laser writing dye, will also absorb light from the pulsed optical darkening source, it also will contribute to the optical darkening. However, the use of additional light absorbing material, component three, specifically for the pulsed optical darkening is a crucial aspect of the preferred embodiment. Compositions using only a writing dye absorbing primarily in a narrow band of wavelengths centered near the wavelength of the writing laser, typical 780 nm to 840 nm for semiconductor lasers, require higher power optical pulses for uniform darkening with Xe flash tubes.

As an alternative or in addition to component three, substrate coatings which absorb light from the pulsed optical darkening source can be used to produce pulsed optical darkening. For example, liquid crystal cells with low ohms/square transparent conductive oxide such as $In_xSn_yO_z$ coated on the inner surface of the substrate in proximity to the liquid crystal will also darken upon exposure to an intense light pulse. High ohm/square coatings give high optical transmission but require very high pulse energy for optical darkening. Very low ohm/square coatings give low optical transmission but require much lower pulse energies for optical darkening. A preferred embodiment is to use transparent conductive oxide coatings including Sn and/or In with ohm/square values in the range 4 to 10 ohms/square.

An important aspect of the present invention is the fourth component, a photostabilizer. The photostabilizer protects against photochemical degradation or, in other words, dye and/or liquid crystal photodecomposition. Once optical energy is absorbed by a molecule, an irreversible chemical process may take place involving the excited molecular state created by this absorption. The photostabilizer serves to convert the absorbed energy into harmless thermal vibrations that heat the liquid crystal, as opposed to irreversible chemical reactions which destroy the liquid crystal or dye molecules.

In a preferred embodiment, component four consists of 0.5% to 4% by weight of a photostabilizer selected from a class of molecules known as triplet quenchers by the method described below. It is believed that the most effective triplet quenchers are those which are electron donors (as opposed to electron acceptors) relative to the liquid crystal molecules and, therefore, complex with the liquid crystal molecules as donor-acceptor pairs. Suitable donor molecules can be identified by a trial and error type evaluation of candidate triplet quencher molecules, such as those in Table 1. This evaluation consists of exposure of the liquid crystal-dye-stabilizer mixtures to projection light and pulsed darkening light. The best photostabilizers will slow down degradation processes which cause shifts in the optical absorption spectra, the transparency, and the liquid crystal phase transition temperatures of the liquid crystal-dye-photostabilizer mixtures. Experimental evidence also indicates that the best photostabilizers have molecular structures which allow them to physically complex with the liquid crystal molecules without steric hindrance.

Thus the triplet quencher Ph-Ph, commonly known as biphenyl, is a particularly effective stabilizer for biphenyl liquid crystal mixtures such as S2. Other biphenyl derivatives which do not produce steric hindrance should also be candidates for effective photostabilizers for biphenyl liquid crystal mixtures. As a preliminary screening method, well-known techniques such as UV-visible spectroscopy and photoelectron spectroscopy can be used to determine which of the triplet quenchers are electron donors relative to the molecules to be stabilized and are, therefore, candidate photostabilizers. The specific molecular structures of candidate photostabilizers must then be considered to determine which ones will not be prevented from complexing by steric hindrance effects. Generally, those which conform to the liquid crystal molecular backbone would be the most promising candidates. Table 1 below comprises a list of common triplet quenchers as provided by N. T. Turro, "Modern Molecular Photochemistry," 1978, pp 353.

TABLE 1.

Common Triplet Quenchers and Energies (in kcal/mole).
Energies of Some Common Triplet Quenchers

| Compound | $E_S$ | $E_T$ |
|---|---|---|
| $CH_3CH=CHCH_3$ | ~120 | 78 |
| $PhC\equiv CH$ | ~100 | 72 |
| Ph—Ph | ~95 | 66 |
| Ph—Ph—Ph (ortho-terphenyl) | ~90 | 62 |
| $CH_2=CH-CH=CH_2$ | ~90 | 60 |
| $CH_3-CH=CH-CH=CH_2$ | ~90 | 59 |
| Ph—Ph—Ph (para-terphenyl) | ~105 | 58 |
| Cyclopentadiene | ~90 | 58 |
| Cis-stilbene | ~95 | 57 |
| 1,3-cyclohexadiene | ~80 | 53 |
| Trans-stilbene | ~90 | 50 |
| Azulene | ~40 | ~30 |
| Tetracene | ~45 | ~29 |

TABLE 1.-continued

Common Triplet Quenchers and Energies (in kcal/mole).
Energies of Some Common Triplet Quenchers

| Compound | $E_S$ | $E_T$ |
| --- | --- | --- |
| Oxygen | — | 23 |

Laser light at 830 nm does not decompose the dye, however, ultraviolet absorbing filters (not shown), situated between the light source and cell, are very effective in minimizing photodecomposition.

Once a liquid crystal cell 30 has been darkened there may be a question as to the uniformity of the darkening. To test uniform darkening in the cell 30, a capacitive monitoring arrangement incorporated in power supply 46 is used. The capacitance of different regions of the cell is monitored. The underlying principle is that liquid crystal will have differing capacitance depending on the density of scattering centers. If it is determined that there is insufficient darkening, i.e., too few scattering centers, then the operator is alerted that the flash tube 42 is aging or that there is a temperature problem, etc.

In summary, there are several advantages to the optical pulsed thermal darkening method over the electrical pulsed thermal darkening method. For instance, there is no need to fabricate patterned electrode structures and there is no need to precisely control electrical resistances of the electrode connecting members. Furthermore, the ability to design and fabricate electrodes concentrating primarily on optical and cosmetic properties, with less constraint by electrical properties, is fostered. No high voltage or high current pulses are required in the liquid crystal cell 30, thereby prolonging cell life. And additionally, there is less sensitivity to cosmetic defects such as those caused by pinholes in electrodes.

It should further be apparent to those skilled in the art that various changes in form and details of the invention as shown and described may be made. It is intended that such changes be included within the spirit and scope of the claims appended hereto.

What is claimed is:

1. An apparatus for creating essentially areally uniform scattering texture in a thermo-optic cell, comprising:
    means for applying a pulse of optical energy to the entire area of a thermo-optic cell having liquid crystal material therein at a first temperature; and
    means for absorbing said optical energy and converting said optical energy to thermal energy for heating said liquid crystal material to a second temperature, such that an expiration of said pulse of optical energy results in a rapid cooling of said liquid crystal material causing a formation of an essentially areally uniform scattering texture in said liquid crystal material in said area;
    said liquid crystal material including molecules of a biphenyl derivative for stabilizing said liquid crystal material by energy transfer, thereby significantly increasing the number of optical energy pulses to which said thermo-optic cell can be responsive;
    said biphenyl derivative molecules having a backbone conforming to said liquid crystal material and lacking any structure that would prevent complexing as an electron donor-acceptor pair with said molecules of said liquid crystal material.

2. The apparatus of claim 1 wherein said stabilizing energy transfer takes place in the manner of triplet quenching.

3. The apparatus of claim 1 wherein said biphenyl derivative is an electron donor relative to at least a portion of the molecules of said liquid crystal material being stabilized.

4. The apparatus of claim 1 wherein at least a portion of said liquid crystal molecules are biphenyl derivatives.

5. The apparatus of claim 4 wherein a concentration of said biphenyl derivative molecules in said biphenyl liquid crystal material is between 0.5% and 4% by weight of biphenyl.

6. The apparatus of claim 1 wherein said liquid crystal material is smectic A liquid crystal.

7. A method for producing a uniform texture of scattering centers in a liquid crystal imaging system having a liquid crystal cell with liquid crystal material therein, comprising the steps of:
    adding a biphenyl derivative to stabilize said liquid crystal material by energy transfer;
    impinging an essentially spatially and temporally simultaneous pulse of incident optical energy upon the entire area of a liquid crystal cell having liquid crystal material therein;
    absorbing and converting said pulse of incident optical energy impinged on said liquid crystal material for heating said liquid crystal material to a level of reduced molecular order; and
    removing said simultaneous pulse of incident optical energy to rapidly cool said liquid crystal material to produce an essentially areally uniform texture of scattering centers in the material.

8. The method of claim 7 wherein said energy transfer takes place in the manner of triplet quenching.

9. In an optical system including a thermo-optic cell exposed to illumination, said thermo-optic cell having a layer of liquid crystal material therein, the improvement comprising:
    biphenyl derivative molecules located in said liquid crystal material for stabilizing by energy transfer said liquid crystal material against degradation caused by said intense illumination, said biphenyl derivative molecules having a backbone conforming to said liquid crystal material and lacking any structure that would prevent complexing as an electron donor-acceptor pair with said liquid crystal material.

10. The improvement according to claim 9 wherein at least a portion of said liquid crystal material is composed of biphenyl derivative liquid crystal molecules other than said biphenyl derivative molecules.

11. The improvement according to claim 9 wherein a concentration of said biphenyl derivative molecules in said liquid crystal material is between 0.5% and 4% by weight of biphenyl.

12. The improved method according to claim 11 wherein said energy transfer takes place in the manner of triplet quenching.

13. In a method of operating a thermo-optic cell exposed to illumination, said cell having a layer of liquid crystal material therein, the improvement comprising the step of:
    adding biphenyl derivative molecules for stabilizing by energy transfer said liquid crystal material against degradation caused by said illumination, said biphenyl derivative molecules having a backbone conforming to said liquid crystal material and lacking any structure that would prevent complexing as an electron donor-acceptor pair with said liquid crystal material.

14. The improved method according to claim 13 wherein at least a portion of said liquid crystal material is composed of biphenyl derivative liquid crystal molecules other than said biphenyl derivative molecules.

* * * * *